US009086808B2

(12) United States Patent
Itoh

(10) Patent No.: US 9,086,808 B2
(45) Date of Patent: Jul. 21, 2015

(54) STORAGE APPARATUS, LOAD CONDITION REDUCTION METHOD OF THE STORAGE APPARATUS AND SYSTEM

(75) Inventor: Yoshiharu Itoh, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 187 days.

(21) Appl. No.: 13/527,078

(22) Filed: Jun. 19, 2012

(65) Prior Publication Data

US 2013/0031307 A1 Jan. 31, 2013

(30) Foreign Application Priority Data

Jul. 25, 2011 (JP) ................................ 2011-162208

(51) Int. Cl.
*G06F 3/06* (2006.01)
*G06F 12/08* (2006.01)

(52) U.S. Cl.
CPC ............ *G06F 3/0611* (2013.01); *G06F 3/0659* (2013.01); *G06F 3/0689* (2013.01); *G06F 12/0866* (2013.01); *G06F 2212/262* (2013.01)

(58) Field of Classification Search
CPC ... G06F 3/0611; G06F 3/0659; G06F 3/0689; G06F 12/0866
USPC .................. 711/113, 114, E12.019, E12.008; 718/106; 710/52
See application file for complete search history.

(56) References Cited

U.S. PATENT DOCUMENTS

| | | | | |
|---|---|---|---|---|
| 5,197,145 A | * | 3/1993 | Kitamura et al. | 711/143 |
| 5,581,726 A | * | 12/1996 | Tanaka | 711/134 |
| 5,701,516 A | * | 12/1997 | Cheng et al. | 710/22 |
| 2004/0117579 A1 | * | 6/2004 | Wu et al. | 711/170 |
| 2007/0038833 A1 | * | 2/2007 | Yamamoto et al. | 711/167 |
| 2007/0136606 A1 | | 6/2007 | Mizuno | |
| 2007/0266197 A1 | * | 11/2007 | Neyama et al. | 710/310 |
| 2009/0044000 A1 | * | 2/2009 | Nakayama et al. | 713/1 |
| 2009/0172249 A1 | * | 7/2009 | Matthews | 711/103 |
| 2010/0017573 A1 | * | 1/2010 | Shinozaki et al. | 711/162 |
| 2010/0115310 A1 | * | 5/2010 | Kubota et al. | 713/320 |
| 2010/0199050 A1 | | 8/2010 | LaFrese et al. | |

FOREIGN PATENT DOCUMENTS

| | | |
|---|---|---|
| JP | 9-258907 | 10/1997 |
| JP | 2000-56932 | 2/2000 |

(Continued)

OTHER PUBLICATIONS

HP StorageWorks XP Disk Array and Mainframe white Paper, "FICON Buffer Credits", Hewlett-Packard Development Company, Feb. 2010, pp. 1-10.*

(Continued)

*Primary Examiner* — Cheng-Yuan Tseng
*Assistant Examiner* — Kamal K Dewan
(74) *Attorney, Agent, or Firm* — Staas & Halsey LLP

(57) ABSTRACT

A storage apparatus includes a memory that stores a job management information that registers a write job corresponding to a write command upon receiving the write command from other apparatus, a cache memory that stores data designated as target data by the write command, a storage drive that records the data stored in the cache memory to a storage medium based on the write job registered in the job management information, and a controller that controls a timing to output to the other apparatus a completion report of the write command based on a load condition of the storage device related to an accumulation count of write job acquired from the job management information.

10 Claims, 11 Drawing Sheets

(56) References Cited

FOREIGN PATENT DOCUMENTS

| | | |
|---|---|---|
| JP | 2000-347999 | 12/2000 |
| JP | 2007-157049 | 6/2007 |

OTHER PUBLICATIONS

Japanese Office Action dated Jan. 20, 2015 in corresponding Japanese Patent Application No. 2011-162208.

* cited by examiner

FIG. 3A

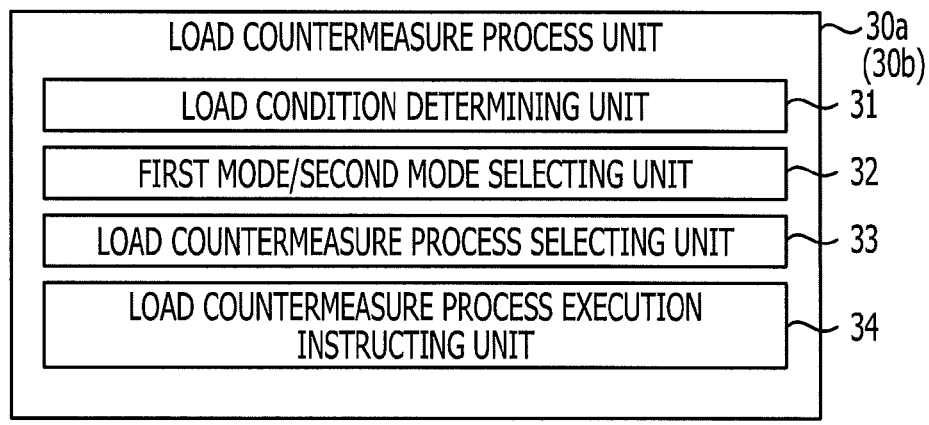

FIG. 3B

| FIRST MEMORY (SECOND MEMORY) 16a(16b) | | 35 MODE MANAGEMENT TABLE | |
|---|---|---|---|
| MODE TYPE | PROCESSING TYPE | PROCESSING CONTENTS | SETTING |
| FIRST MODE | NORMAL PROCESSING | WRITE-BACK MODE SETTING | OFF |
| SECOND MODE (LOAD COUNTERMEASURE MODE) | LOAD COUNTERMEASURE PROCESS 1 | SWITCH HANDLING CONTROLLER | ON |
| | LOAD COUNTERMEASURE PROCESS 2 | CHANGE COMMUNICATION BANDWIDTH BETWEEN CONTROLLERS | OFF |
| | LOAD COUNTERMEASURE PROCESS 3 | ADD WAITING TIME | OFF |
| | LOAD COUNTERMEASURE PROCESS 4 | WRITE-THROUGH MODE SETTING | OFF |
| | LOAD COUNTERMEASURE PROCESS 5 | CHANGE HOST I/F TRANSFER SPEED SETTING | OFF |
| | LOAD COUNTERMEASURE PROCESS 6 | CHANGE FC SETTING | OFF |

STORAGE APPARATUS, LOAD CONDITION REDUCTION METHOD OF THE STORAGE APPARATUS AND SYSTEM

CROSS-REFERENCE TO RELATED APPLICATION

This application is based upon and claims the benefit of priority of the prior Japanese Patent Application No. 2011-162208, filed on Jul. 25, 2011, the entire contents of which are incorporated herein by reference.

FIELD

The embodiments relate to a storage apparatus, a load condition reduction method of the storage apparatus and a system.

BACKGROUND

A Redundant Arrays of Inexpensive Disks (RAID) apparatus is well known in the art as a storage apparatus equipped with a plurality of storage drives. A hard disk drive (HDD) is one example of a storage drive.

The HDD executes seeking of a target track using a magnetic head while a magnetic disk medium that is a storage medium is rotating at a certain rotating speed, and moves the magnetic head closer to the magnetic disk to magnetically record and play data.

Therefore, the processing speed is very slow compared to the processing speed of the CPU of the host computer since the writing and reading processing in the HDD is executed with mechanical operations. As a result, the HDD includes various functions to compensate for the discrepancy (performance limit) in processing speeds. A function called "write-back" is known as one of these functions.

A command issued by a host computer is received by a RAID apparatus controller that controls a plurality of HDDs and is stored in a queue in a job management table in a memory. The HDD is sequentially instructed to execute jobs waiting for processing registered in the job management table.

A controller of the RAID apparatus temporarily stores write data accompanying a write command in a cache memory when the command is a write command, and returns a completion report for the write command to the host computer at the time that the storing is completed (normal completion).

The write data temporarily stored in the cache memory is written in an HDD at a time when processing is available. Thus, the write-back function makes use of the feature that the storage operation of a cache memory is faster than that of an HDD. Also the performance limitations of the HDD may be alleviated.

However, write commands are issued by the host computer to the storage apparatus frequently and thus high load conditions on the storage apparatus may continue. In this case, write jobs waiting for processing to the HDDs accumulate in the job management table and there is a possibility that ultimately the storage apparatus may not be able to accept new commands and thus enter a queue full state.

Japanese Patent Laid-open No. 9-258907 and Japanese Patent Laid-open No. 2000-56932 are examples of related art.

SUMMARY

According to an aspect of the invention, a storage apparatus includes a memory that stores a job management information that registers a write job corresponding to a write command upon receiving the write command from other apparatus, a cache memory that stores data designated as target data by the write command, a storage drive that records the data stored in the cache memory to a storage medium based on the write job registered in the job management information, and a controller that controls a timing to output to the other apparatus a completion report of the write command based on a load condition of the storage device related to an accumulation count of write job acquired from the job management information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B describe a load countermeasure process unit.

DESCRIPTION OF EMBODIMENT

It is an object of the embodiments disclosed herein to provide a storage apparatus that alleviates high load conditions and a storage apparatus high load condition reduction method.

Figure 1:
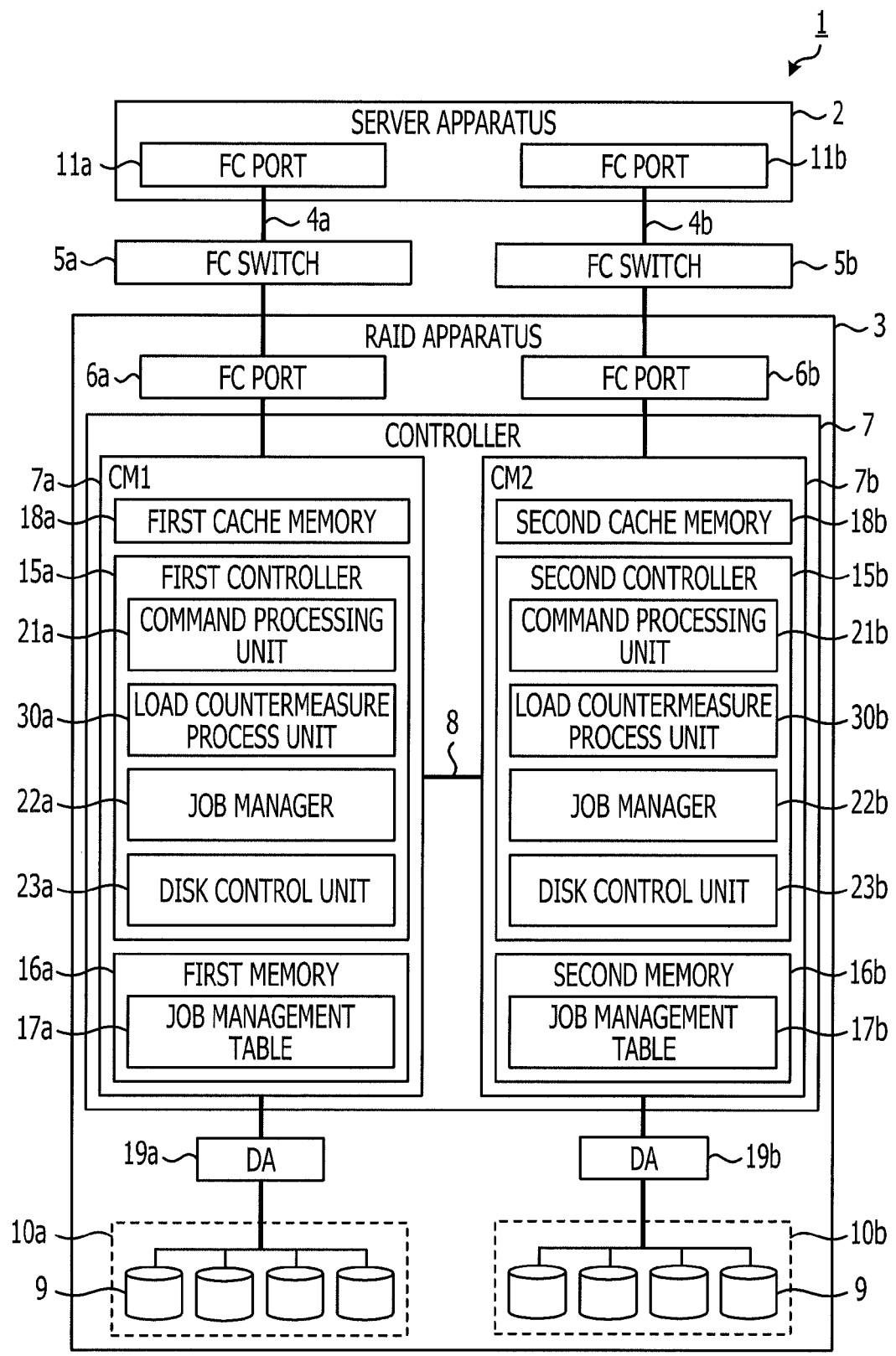
FIG. 1 is a schematic view of a computer system configuration.

In the following description, an embodiment will be described in detail with reference to the drawings. FIG. 1 is a schematic view of a computer system configuration. A computer system 1 includes a server apparatus 2 that is an example of a host computer, and a storage apparatus 3. The storage apparatus 3 illustrates an example using a RAID (Redundant Arrays of Inexpensive Disks) apparatus. The server 2 is an example of other apparatus for the storage apparatus.

The server apparatus 2 is connected to the storage apparatus 3 through a host interface. In the present embodiment, a fiber channel interface is used as the host interface.

Fiber channel ports (FC ports) 6a and 6b of the storage apparatus 3 are respectively connected to fiber channel ports (FC ports) 11a and 11b of the server apparatus 2 through respective fiber cables 4a and 4b and respective fiber channel switches (FC switches) 5a and 5b. An iSCSI or an SAS (serial attached SCSI) may be used as the host interface.

The storage apparatus 3 includes a controller 7 that is equipped with first and second controller modules 7a and 7b. The first and second controller modules 7a and 7b are connected through an internal bus 8 and provide redundancy with each other by sending and receiving write commands and write data back and forth. The storage apparatus 3 further includes a power source device (not illustrated) that supplies power to each portion.

The first controller module (CM1) 7a includes a first controller 15a, a first memory 16a, and a first cache memory 18a. The first controller module (CM1) 7a executes data recording and playback control and the like with a plurality of storage drives 9 of a storage drive cluster 10a connected thereto via a device adapter (DA) 19a. The first controller 15a may be a processing circuit such as a processor (e.g. Central Processing Unit (CPU)) or a Digital Signal Processor, etc. Also, the processing circuit may be a logic device such as a Field-Programmable Gate Array (FPGA).

The first controller 15a executes various controls in response to commands from the server device 2. The first memory 16a is a memory for storing various programs and various types of control information used by the first controller 15a. The first cache memory 18a is a memory for temporarily storing data (write and read data) input and output to and from the storage drive cluster 10a.

Control functions such as a command processing unit 21a, a load countermeasure process unit 30a, a job manager 22a, a disk control unit 23a and the like in the first controller 15a are configured by executing of programs stored in the first memory 16a, for example. The first controller 15a also includes a memory control function of the first cache memory 18a. The memory control function may be configured in the first controller 15a by executing programs stored in the first memory 16a, for example.

The second controller module (CM2) 7b includes a second controller 15b, a second memory 16b, and a second cache memory 18b in the same way as the first controller module 7a. The second controller module (CM2) 7b executes data recording and playback control and the like with a plurality of storage drives 9 of a storage drive cluster 10b connected thereto via a device adapter (DA) 19b.

The second controller 15b executes various controls in response to commands from the server apparatus 2. The second memory 16b is a memory for storing various programs and various types of control information used by the second controller 15b. The second cache memory 18b is a memory for temporarily storing data (write and read data) input and output to and from the storage drive cluster 10b. The second controller 15b may be a processing circuit such as a processor (e.g. Central Processing Unit (CPU)) or a Digital Signal Processor, etc. Also, the processing circuit may be a logic device such as a Field-Programmable Gate Array (FPGA).

Control functions such as a command processing unit 21b, a load countermeasure process unit 30b, a job manager 22b, a disk control unit 23b and the like are configured by executing of programs stored in the second memory 16b, for example, in the second controller 15b in the same way as the first controller 15a. The second controller 15b also includes a memory control function of the second cache memory 18b. The memory control function may be configured in the second memory by executing programs stored in the second memory 16b, for example.

The command processing units 21a and 21b analyze commands from the server apparatus 2 and output command processes (jobs) corresponding to the commands to the respective job managers 22a and 22b. Input and output commands with respect to the storage drives 9 are created based on the contents of the command processes (jobs).

The command processing units 21a and 21b output completion reports indicating that the command processes were completed normally, or error reports indicating that the command processes were abnormally finished, to the server apparatus 2 through the respective FC ports 6a and 6b.

The command processing units 21a and 21b control to temporarily store write data designated as a processing target data by the write commands in the respective first and second cache memories 18a and 18b. The command processing units 21a and 21b control the temporary storage of read data outputted from the storage drive clusters 10a and 10b in the respective first and second cache memories 18a and 18b.

The job managers 22a and 22b receive command processes outputted by the respective command processing units 21a and 21b and register the command processes (jobs) as process waiting queues in job management tables 17a and 17b of the respective first and second memories 16a and 16b. The job management tables 17a and 17b are an example of job management information, respectively.

The job managers 22a and 22b refer to the job management tables to grasp the command processing state and then instruct the respective disk control units 23a and 23b to execute the command processes. For example, the job managers 22a and 22b instruct the disk control units 23a and 23b to execute write processing at a preset job execution timing.

The job execution timing may occur when an accumulation count of write jobs recorded in the job management tables 17a and 17b exceed, for example, 70%, or when a utilization rate of the cache memories 18a and 18b exceed, for example, 70%.

The disk control units 23a and 23b receive the instruction from the respective job managers 22a and 22b and create input/output commands to cause the data to be written into or played from the target logical addresses. The disk control units 23a and 23b then issue the created input/output commands to the respective storage drive clusters 10a and 10b.

The load countermeasure process units 30a and 30b monitor the load conditions of the respective first and second controllers 15a and 15b to determine whether or not the storage apparatus 3 has a high load condition. The load countermeasure process units 30a and 30b execute load countermeasures if the load condition is high. The load condition is derived from an accumulation count of the write job acquired from the job management tables. The load condition relates to the accumulation count of the acquired write job. Hereinafter, the accumulation count of the acquired write job is described as "write job accumulation count." The load countermeasure process units 30a and 30b are described in detail below.

The plurality of storage drives 9 are hard disk drives (HDD), but a portion thereof may be solid state drives (SSD). The HDDs use magnetic disk media as recording media and have a plurality of magnetic disks and a plurality of magnetic heads inside a housing to allow for a large capacity of storage.

The HDD use the magnetic heads to seek target tracks while the magnetic disk media that are the storage media are rotating at a certain rotating speed, and the magnetic heads are moved close to the magnetic disks to magnetically record and play data.

Therefore, the input/output bandwidth of an HDD is narrower than the input/output bandwidth of the host interface since the magnetic disk media rotating drive and the magnetic head seek control are mechanical drive operations. In other words, a discrepancy in data processing speed is generated. Therefore during normal operations, the storage apparatus executes write-back processing.

Figure 2:
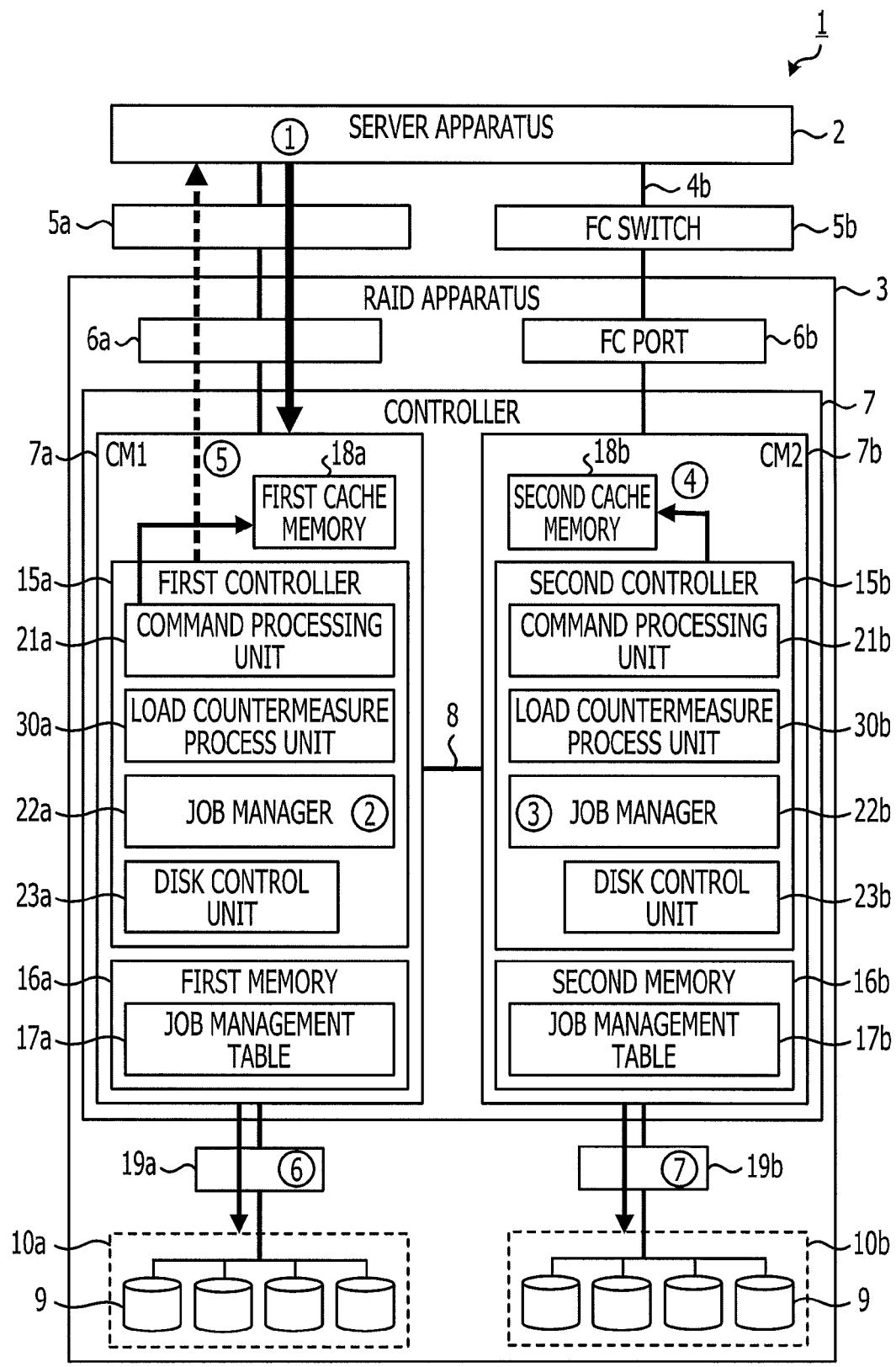
FIG. 2 illustrates write-back processing of a storage apparatus.

FIG. 2 illustrates write-back processing of a storage apparatus. The server apparatus 2 issues to the first controller module 7a a write command for a target storage drive of the storage drive cluster 10a (procedure 1).

The command processing unit 21a receives and analyzes the write command and outputs the write job corresponding to the write command to the job manager 22a. The job manager 22a registers the write job outputted by the command processing unit 21a in the job management table 17a in a process waiting queue (procedure 2). The command processing unit 21a then stores the write data designated as a processing target data by the write command in the first cache memory 18a.

Additionally, the first controller 15a outputs a write command for redundancy and the write data stored in the first cache memory 18a to the second controller module 7b. The command processing unit 21b receives and analyzes the write command and outputs the write job corresponding to the write command to the job manager 22b.

The job manager 22b registers the write job outputted by the command processing unit 21b in the job management table 17b in a process waiting queue (procedure 3). The second controller 15b stores the write data in the second cache memory 18b (procedure 4). The second controller module 7b then outputs a completion response to the first controller module 7a.

The first controller 15a receives the completion response and creates a completion report concerning the write command for the server apparatus 2 and outputs the completion report to the server apparatus 2 (procedure 5). The first controller module 7a then enters a state of waiting for a command. The job manager 22a then outputs a write instruction to the disk control unit 23a at a certain job execution timing.

The disk control unit 23a issues a write command to the writing target storage drive 9 of the storage drive cluster 10a to cause write processing of the write data stored in the first cache memory 18a to be executed (procedure 6). After the completion response of the write processing is received from the writing target storage drive 9, the job manager 22a erases the completed write processing from the job management table 17a.

The job manager 22b outputs at the certain job execution timing a write instruction to the disk control unit 23b to execute writing to the writing target storage drive 9 of the storage drive cluster 10b.

The disk control unit 23b then executes the write processing of the write data stored in the second cache memory 18b (procedure 7). After the completion response of the write processing is received from the writing target storage drive 9, the job manager 22b erases the completed write job from the job management table 17b.

In this way, write jobs corresponding to the write commands are accumulated in the job management tables upon receiving a write command from the server apparatus 2 in the write-back processing. Moreover, the data designated as a processing target data by the write command is accumulated in the cache memories.

Therefore, whenever a write command is issued by the server apparatus 2, there is a possibility that write processing waiting for processing to the storage drive 9 may accumulate and generate a queue full state.

As a result, the number of commands issued by the server apparatus 2 may be limited based on a maximum I/O volume set in the operating system of the server apparatus 2 or the host bus adapter and the like according to the capabilities of the storage drives 9. The maximum I/O volume refers to the number of input/output commands that may be accepted by the storage apparatus 3.

However, the maximum I/O volume is set by a user based on specifications of the operating system, the host bus adapter, and the storage apparatus. As a result, the maximum I/O volume may not be set appropriately.

In this case, a state in which an available bandwidth of the FC interface (host bus adapter) exceeds the available bandwidth of the drive interface (device adapter) may continue and the job processing capacity may not be able to handle the increased volume of the newly added write processing. Ultimately, the number of processable jobs exceeds the limit and a queue full state is generated.

Accordingly, the storage apparatus determines its own load condition and causes the load countermeasure process units 30a and 30b to execute load countermeasures to reduce the loads when a continuous excessive load is anticipated. Specifically, the output of the completion report to the server apparatus 2 is purposefully delayed more than normal processing.

Specifically, the server apparatus 2 uses an interface specification that does not allow the issuance of commands until a completion report arrives from the storage apparatus 3. As a result, the storage apparatus 3 can interrupt the acceptance of commands.

Thus, by extending the time from the reception of the write command to the output of the completion report, the time for write processing is assured, write processing to the storage drives is facilitated, and write processing waiting for processing is lowered to reduce the load condition. In this way, the operation for appropriately setting the maximum I/O volume can be removed and optimal system operations can be achieved according to the processing capabilities of the storage apparatuses by reducing the load conditions.

FIGS. 3A and 3B describe the load countermeasure process unit. FIG. 3A is a schematic view of a load countermeasure process unit configuration. FIG. 3B illustrates a mode management table. The load countermeasure process units 30a and 30b each include a load condition determining unit 31, a first mode/second mode selecting unit 32, a load countermeasure process selecting unit 33, and a load countermeasure process execution instructing unit 34. These units are configured by programs.

The load condition determining unit 31 determines a load condition at a predetermined timing such as at a certain time or upon receiving a write command and the like. The load condition determining unit 31 is instructed by the job managers 22a and 22b to acquire the write job accumulation count registered as queues in the respective job management tables 17a and 17b.

The load condition determining unit 31 then calculates a load factor based on the acquired write job accumulation counts and a maximum value of the write jobs that can be registered in the job management tables. Thus, the storage apparatuses are able to determine their own load conditions. As a result, a special mechanism might not be used for the host computer side such as the server apparatus.

The first mode/second mode selecting unit 32 selects either a first mode (normal operating mode) or a second mode (load countermeasure mode) according to the determined load factor. For example, the second mode is selected if the load factor is 70% or more.

The load countermeasure process selecting unit 33 selects one of a plurality of load countermeasure processes according to a load condition improvement situation. Operating settings of the first and second controller modules 7a and 7b are executed in response to the selected mode and the selected load countermeasure process. The load countermeasure process execution instructing unit 34 then instructs the control units to execute the set load countermeasure processes.

As illustrated in FIG. 3B, a mode management table 35 is stored in each of a first memory 16a and a second memory 16b. A mode type, a process type, processing contents, and an operating setting flag are registered in the mode management tables 35. The first mode/second mode selecting unit 32 and the load countermeasure process selecting unit 33 refer to the mode management tables 35 to select the mode and the load countermeasure process.

The first mode/second mode selecting unit 32 and the load countermeasure process selecting unit 33 also register the operating setting flag. The load countermeasure process unit 30 then refers to the operating setting flag to control the mode and the load countermeasure process according to the operating setting flag.

The first mode is a normal processing mode and is a mode in which write-back processing is executed when a write command is received. The second mode is a load countermeasure process mode and causes the timing of outputting the completion report to the server apparatus 2 to be delayed in comparison to the normal processing mode time.

Six types of load countermeasure processes are registered in the mode management tables 35. A load countermeasure process 1 is a process for switching the controller handling the write command processes to another controller. The load countermeasure process 2 is a process for changing the communication bandwidth between the controllers of the first and second controller modules 7a and 7b.

The load countermeasure process 3 is a process for adding a predetermined waiting time so that the timing to output the completion report to the server apparatus 2 is delayed. The load countermeasure process 4 is a process to set a write-through mode, transfer the write data directly to the storage drive 9 to execute the write processing when the write command is received, and store the write data in the cache memories 18a and 18b at the same time.

The load countermeasure process 5 is a process to change the transfer speed setting in the host interface (host I/F). The load countermeasure process 6 is a process to change the FC setting. For example, a BB credit (buffer-to-buffer credit) setting is changed in the load countermeasure process 6. Accordingly, the allowable number of frames that can be sent and received between the server apparatus 2 and the first controller module 7a is changed.

Figure 4:
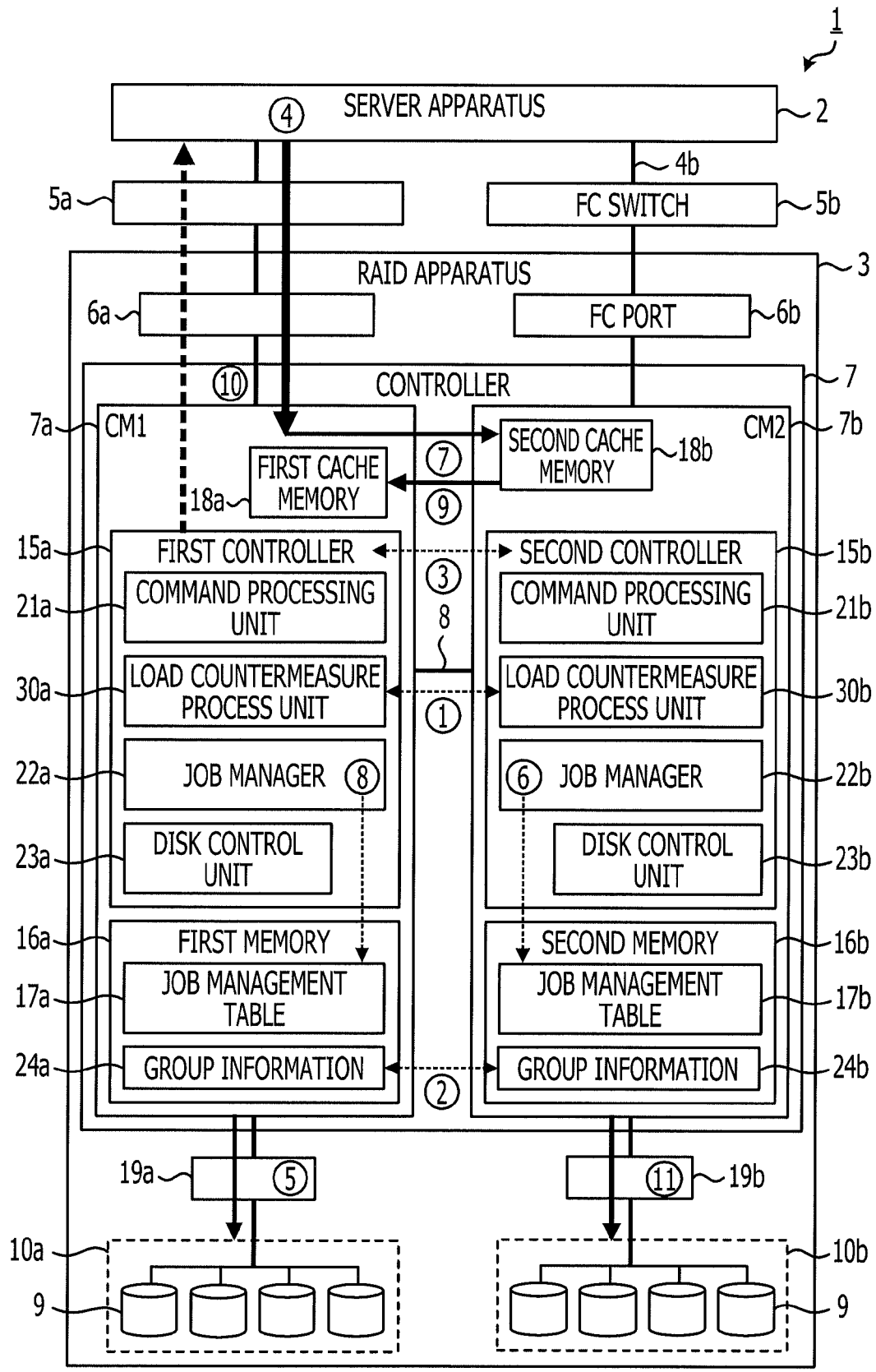
FIG. 4 illustrates a load countermeasure process 1.

FIG. 4 illustrates a load countermeasure process 1. When the load factor determined by the load condition determining unit 31 exceeds a first threshold (for example, 70%) in the load countermeasure process unit 30a, the first mode/second mode selecting unit 32 selects the second mode.

The load countermeasure process selecting unit 33 selects the load countermeasure process 1. The operating setting flag of the first controller module 7a is then set to the second mode load countermeasure process 1. The load countermeasure process unit 30a issues a command to change the operating settings to the load countermeasure process unit 30b such that the load countermeasure process unit 30b sets the operating setting flag of the second controller module 7b to the second mode load countermeasure process 1 (procedure 1).

The load countermeasure process execution instructing unit 34 switches group information 24a stored in the first memory 16a with the group information 24b stored in the second memory 16b (procedure 2). The group information is LUN (logical unit number) assignment information for identifying the plurality of storage drives.

The server apparatus 2 is able to access the target storage drive since the LUN is specified by the command from the server apparatus 2. By switching the group information, the controller handling the control of the target storage drive is switched from the first controller module 7a to the second controller module 7b (procedure 3).

The procedures 1 to 3 are executed when determining the load condition. The determining of the load condition by the load condition determining unit 31 is implemented at a predetermined timing such as at certain times or upon receiving a write command and the like. The processing of the write command after the operating setting flag is set to the second mode load countermeasure process 1 is described below.

The server apparatus 2 issues to the first controller module 7a a write command concerning the target storage drive of the storage drive cluster 10a (procedure 4). The command processing unit 21a receives and analyzes the write command and acquires the writing target LUN.

The command processing unit 21a checks the group information 24a and realizes that no writing target LUN exists. The command processing unit 21a issues a write command to the second controller module 7b through the internal bus 8 in response to the setting of the second mode load countermeasure process 1, and outputs the write data designated as a processing target data by the write command.

The first controller 15a uses the time until the completion response is received from the second controller module 7b to execute the write jobs registered in the job management table 17a to lower the number of jobs waiting for processing as much as possible (procedure 5).

The command processing unit 21b of the second controller 15b that receives the write command from the first controller module 7a analyzes the write command. The command processing unit 21b checks the group information 24b and realizes that a writing target LUN exists.

The command processing unit 21b outputs the write job corresponding to the write command to the job manager 22a. The job manager 22b registers the write job corresponding to the write command in the job management table 17b (procedure 6). The command processing unit 21b stores the write data in the second cache memory 18b (procedure 7).

The second controller 15b outputs the write command for redundancy and the write data stored in the second cache memory 18b to the first controller module 7a. The command processing unit 21a of the first controller module 7a that receives the write command analyzes the write command and outputs the write job corresponding to the write command to the job manager 22a.

The job manager 22a registers the write job corresponding to the write command in the job management table 17a (procedure 8). The command processing unit 21a stores the write data in the second cache memory 18a (procedure 9). When the storing is completed, the first controller module 7a outputs a completion response to the second controller module 7b.

When the completion response is received, the second controller module 7b outputs a completion response to the first controller module 7a. The first controller 15a receives the completion response and outputs a completion report of the write command to the server apparatus 2 (procedure 10).

The first controller 15a then continuously processes the write jobs registered in the job management table 17a to lower the number of jobs waiting for processing as much as possible. The second controller 15b independently executes the write jobs stored in the job management table 17b (procedure 11).

Thus, by using the load countermeasure process 1 to extend the time from the reception of the write command to the output of the completion report, the time for write processing may be assured. Consequently, the use of the write processing time facilitates the reduction of the number of jobs waiting in the first controller module 7a for processing to help alleviate the high load condition.

Although sending the completion report to the server apparatus 2 is delayed more than in normal processing (when the first mode is set), the delay time is within the timeout setting time of the server apparatus 2. As a result, the load countermeasure process 1 has little impact on the storage apparatus 3 processing performance.

Specifically, the processing performance is reduced by approximately 10% due to the communication conditions between the controllers. However, the server apparatus 2 may not have to recognize the execution of the load countermeasure process 1 and the server apparatus 2 may not have to execute any special processing.

Figure 5:
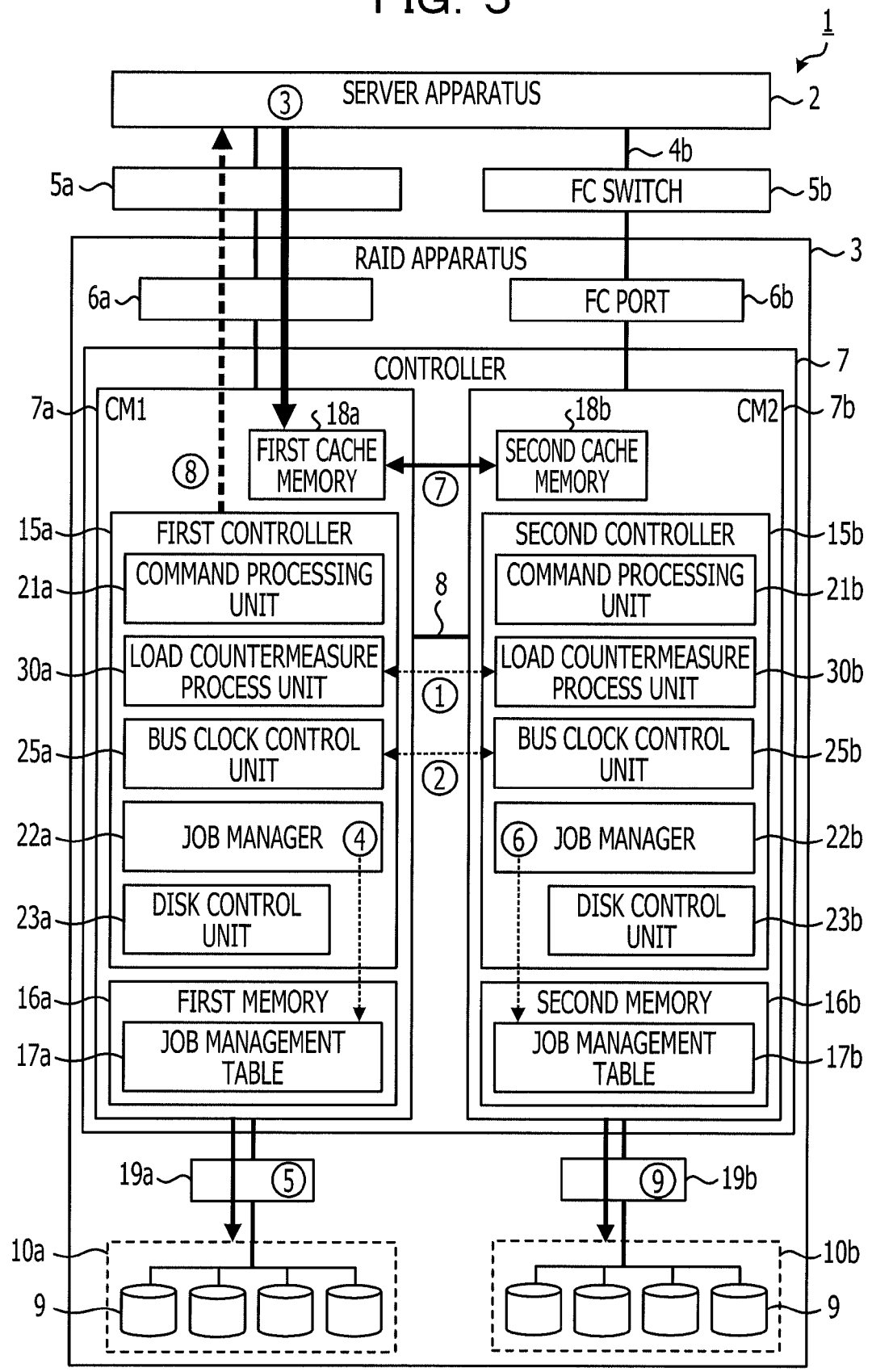
FIG. 5 illustrates a load countermeasure process 2.

FIG. 5 illustrates a load countermeasure process 2. When the load factor determined by the load condition determining unit 31 exceeds a first threshold (for example, 70%) in the load countermeasure process unit 30a, the first mode/second mode selecting unit 32 selects the second mode.

The load countermeasure process selecting unit 33 selects the load countermeasure process 2. The operating setting flag of the first controller module 7a is then set to the second mode load countermeasure process 2. The load countermeasure process unit 30a issues a command to change the operating settings to the load countermeasure process unit 30b such that the load countermeasure process unit 30b sets the operating setting flag of the second controller module 7b to the second mode load countermeasure process 2 (procedure 1).

The load countermeasure process execution instructing unit 34 causes a clock frequency of bus clock control units 25a and 25b to be lowered below that of the normal operating time to change the communication bandwidth between the controllers of the first and second controller modules 7a and 7b. Specifically, the data transfer speed of the internal bus 8 is changed to a preselected value between, for example, 20 to 50% (procedure 2).

As a result, the data transfer of the first and second controller modules 7a and 7b may be made slower than that in the normal operating time. The procedures 1 to 2 are executed when determining the load condition. The determining of the load condition by the load condition determining unit 31 is implemented at a predetermined timing such as at certain times or upon receiving a write command and the like. The processing of the write command after the operating setting flag is set to the second mode load countermeasure process 2 is described below.

The server apparatus 2 issues to the first controller module 7a a write command concerning the target storage drive of the storage drive cluster 10a (procedure 3). The command processing unit 21a receives and analyzes the write command and outputs the write job corresponding to the write command to the job manager 22a.

The command processing unit 21a then stores the write data designated as a processing target data by the write command in the first cache memory 18a. The job manager 22a registers the write job in the job management table 17a as a process waiting queue (procedure 4).

The first controller 15a uses the time from receiving the write command until the completion response is received from the second controller module 7b to execute the write jobs registered in the job management table 17a to lower the number of jobs waiting for processing as much as possible (procedure 5). Additionally, the first controller 15a outputs a write command for redundancy and the write data stored in the first cache memory 18a to the second controller module 7b.

The command processing unit 21b of the second controller module 7b analyzes the write command and outputs the write job corresponding to the write command to the job manager 22b. The job manager 22b of the second controller module 7b then registers the write job corresponding to the received write command in the job management table 17b (procedure 6).

The command processing unit 21b stores the write data in the second cache memory 18b (procedure 7). Upon completion of the storing, the second controller module 7b outputs a completion response to the first controller module 7a.

When the completion response is received, the first controller 15a outputs a completion report to the server apparatus 2 (procedure 8). The first controller module 7a then enters a state of waiting for a command.

The first controller 15a then continuously processes the write jobs registered in the job management table 17a to lower the number of jobs waiting for processing as much as possible. The second controller 15b independently executes the write jobs stored in the job management table 17b (procedure 9).

As described above, by lowering the communication bandwidth between the controllers of the first and second controller modules 7a and 7b to a bandwidth lower than the communication bandwidth during normal operation, the time taken for redundancy (data synchronization) of the second controller module 7b is delayed compared to the same under normal operation.

Thus, by using the load countermeasure process 2 to extend the time from the reception of the write command to the output of the completion report, the time for write processing may be assured. Consequently, the use of the write processing time facilitates the reduction of the number of jobs waiting for processing in the first controller module 7a to help alleviate the high load condition.

Although sending the completion report to the server apparatus 2 is delayed more than in normal processing (when the first mode is set), the delay time is within the timeout setting time of the server apparatus 2. As a result, the load countermeasure process 2 has an intermediate impact on the processing performance of the storage apparatus 3. Specifically, the processing performance is reduced by approximately 20 to 30%, for example, due to the communication bandwidth setting. However, the server apparatus 2 may not have to recognize the execution of the load countermeasure process 2 and the server apparatus 2 may not have to execute any special processing.

Figure 6:
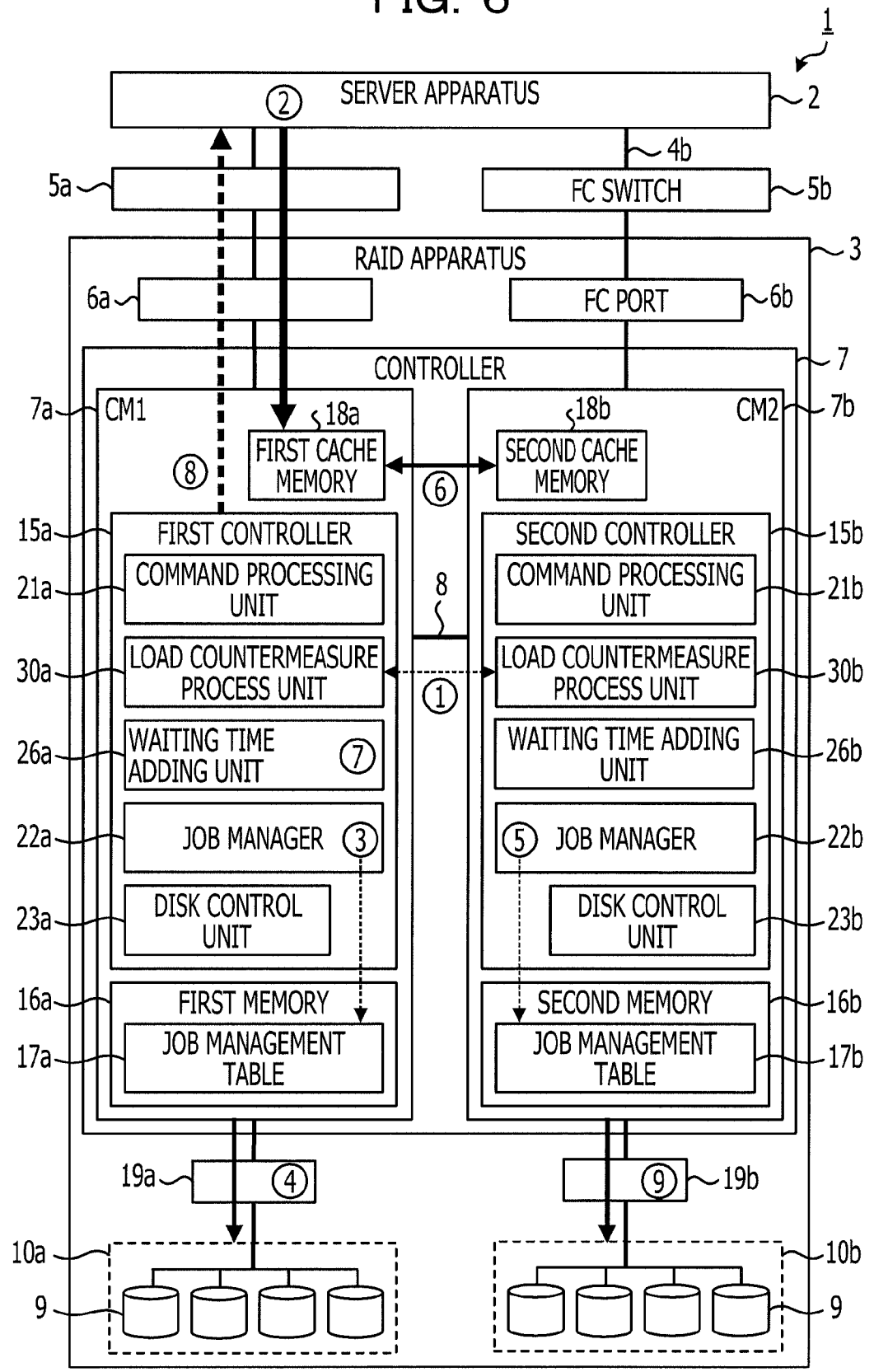
FIG. 6 illustrates a load countermeasure process 3.

FIG. 6 illustrates a load countermeasure process 3. When the load factor determined by the load condition determining unit 31 exceeds a first threshold (for example, 70%) in the load countermeasure process unit 30a, the first mode/second mode selecting unit 32 selects the second mode. The load countermeasure process selecting unit 33 selects the load countermeasure process 3. The operating setting flag of the first controller module 7a is then set to the second mode load countermeasure process 3.

The load countermeasure process unit 30a issues a command to change the operating settings to the load countermeasure process unit 30b such that the load countermeasure process unit 30b sets the operating setting flag of the second controller module 7b to the second mode load countermeasure process 3 (procedure 1).

The load countermeasure process execution instructing unit 34 sets a waiting time adding unit 26a to on. The processing of the write command after the operating setting flag is set to the second mode load countermeasure process 3 is described below.

The server apparatus 2 issues to the first controller module 7a a write command concerning the target storage drive of the storage drive cluster 10a (procedure 2). The command processing unit 21a receives and analyzes the write command and outputs the write job corresponding to the write command to the job manager 22a.

The command processing unit 21a then stores the write data designated as a processing target data by the write command in the first cache memory 18a. The job manager 22a registers the write job in a process waiting queue in the job management table 17a (procedure 3).

The first controller 15a uses the time from receiving the write command until the completion response is received from the second controller module 7b to execute the write jobs registered in the job management table 17a to lower the number of jobs waiting for processing as much as possible (procedure 4). Additionally, the first controller 15a outputs a write command for redundancy and the write data stored in the first cache memory 18a to the second controller module 7b.

The command processing unit 21b of the second controller module 7b analyzes the write command and outputs the write job corresponding to the write command to the job manager 22b. The job manager 22b of the second controller 15b then registers the write job corresponding to the received write command in the job management table 17b (procedure 5).

The command processing unit 21b stores the write data in the second cache memory 18b (procedure 6). The second controller module 7b then outputs a completion response to the first controller module 7a.

The first controller module 7a does not immediately output a completion response to the server apparatus 2 even after receiving the completion response from the second controller module 7b. Specifically, the waiting time adding unit 26a adds a predetermined waiting time (for example, 1 to 10 ms) to the completion report output timing (procedure 7).

The command processing unit 21a uses the waiting time to process write jobs registered in the job management table 17a to reduce the number of jobs waiting for processing. After the added time has elapsed, the first controller 15a outputs a completion report to the server apparatus 2 (procedure 8).

The first controller module 7a then enters a state of waiting for a command. The second controller 15b independently executes the write jobs registered in the job management table 17b (procedure 9).

Thus, by using the load countermeasure process 3 to extend the time from the reception of the write command to the output of the completion report, the time for write processing may be assured. Consequently, the use of the write processing time facilitates the reduction of the number of jobs waiting for processing in the first controller module 7a to help alleviate the high load condition.

The waiting time is set such that the output of the completion report to the server apparatus 2 is executed within the timeout setting time of the server apparatus 2. As a result, the load countermeasure process 3 has an intermediate impact on the processing performance of the storage apparatus 3.

Specifically, the processing performance is reduced by approximately 30 to 40% for example due to the waiting time set by the waiting time adding unit. However, the server apparatus 2 may not have to recognize the execution of the load countermeasure process 3 and the server apparatus 2 may not have to execute any special processing.

Figure 7:
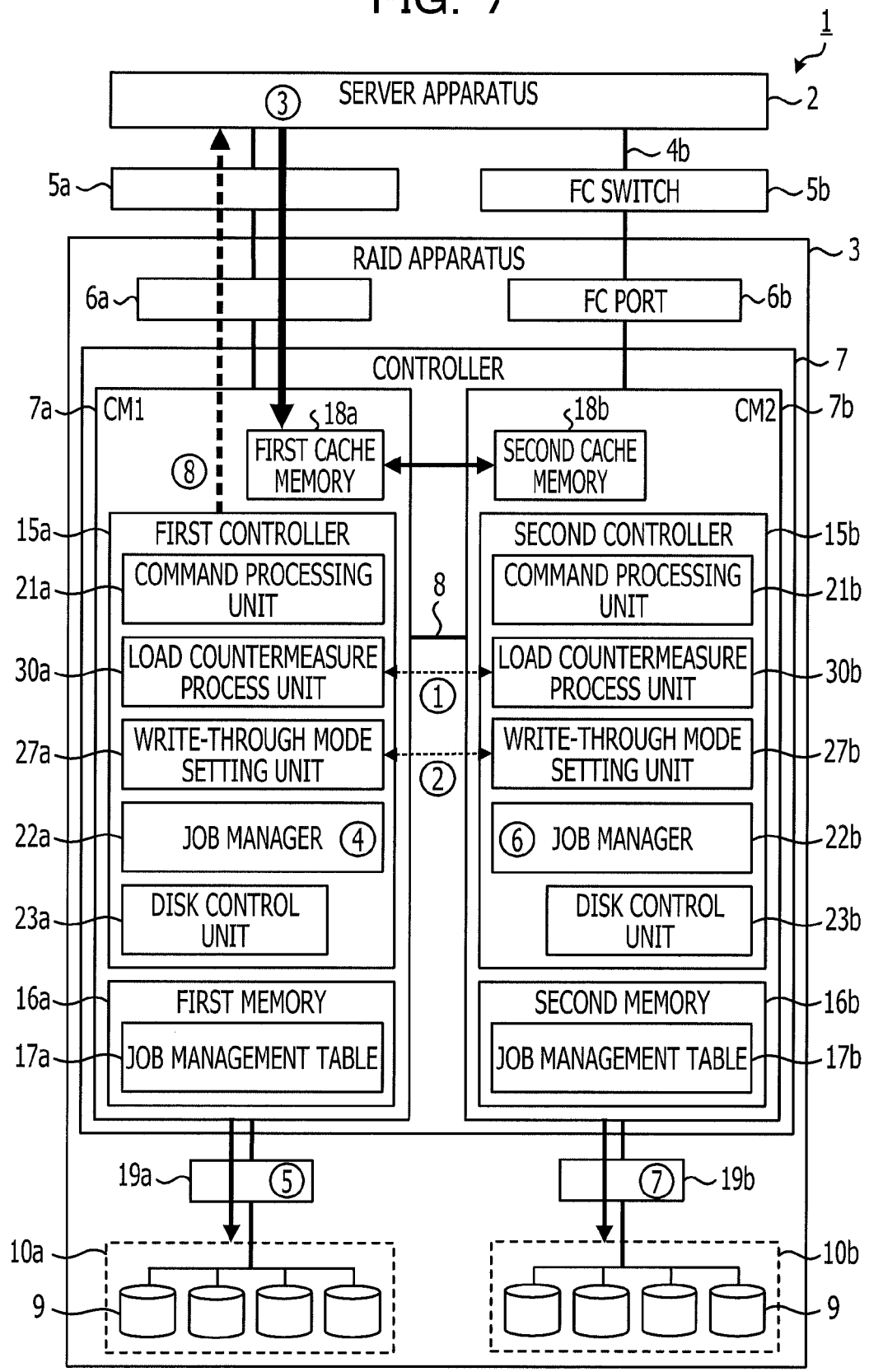
FIG. 7 illustrates a load countermeasure process 4.

FIG. 7 illustrates a load countermeasure process 4. When the load factor determined by the load condition determining unit 31 exceeds a first threshold (for example, 70%), the first mode/second mode selecting unit 32 selects the second mode.

The load countermeasure process selecting unit 33 selects the load countermeasure process 4. The operating setting flag of the first controller module 7a is then set to the second mode load countermeasure process 4. The load countermeasure process unit 30a issues a command to change the operating settings to the load countermeasure process unit 30b such that the load countermeasure process unit 30b sets the operating setting flag of the second controller module 7b to the second mode load countermeasure process 4 (procedure 1).

The load countermeasure process execution instructing unit 34 sets a write-through mode setting unit 27a to on (procedure 2). As a result, the first and second controller modules 7a and 7b are switched from a write-back mode to a write-through mode.

Therefore, the write job corresponding to the write command is not registered as a job waiting for processing in the job management table 17a and write processing to the writing target storage drive 9 is executed promptly by the disk control unit 23a. As a result, the number of the jobs waiting for processing might not be increased.

The procedures 1 to 2 are executed when determining the load condition. The determining of the load condition by the load condition determining unit 31 is implemented at a predetermined timing such as at certain times or upon receiving a write command and the like. The processing of the write command after the operating setting flag is set to the second mode load countermeasure process 4 is described below.

The server apparatus 2 issues to the first controller module 7a a write command concerning the target storage drive of the storage drive cluster 10a (procedure 3). The command processing unit 21a receives and analyzes the write command and outputs the write job corresponding to the write command to the job manager 22a.

The first controller 15a then temporarily stores the write data designated as a processing target data by the write command to the first cache memory 18a at the same time as the write processing to the writing target storage drive 9 of the storage drive cluster 10a is executed.

Specifically, the job manager 22a instructs the disk control unit 23a to promptly execute the write processing corresponding to the write command (procedure 4). The disk control unit 23a then issues a write instruction to the writing target storage drive 9 and outputs the write data received from the server apparatus 2 to the writing target storage drive 9 (procedure 5).

The writing target storage drive 9 then records the received write data in a storage medium. Additionally, the first controller 15a outputs a write command for redundancy and the write data stored in the first cache memory 18a to the second controller module 7b.

The first controller 15a uses the time until the completion response is received from the second controller module 7b to execute the write jobs registered in the job management table 17a to lower the number of jobs waiting for processing as much as possible.

The second controller 15b executes the write processing to the writing target storage drive 9 of the storage drive cluster 10b.

Specifically, the job manager 22b instructs the disk control unit 23b to promptly execute the write processing corresponding to the write command (procedure 6). The disk control unit 23b then issues a write instruction to the writing target storage drive 9 and outputs the write data outputted from the first controller module 7a to the writing target storage drive 9 (procedure 7).

The writing target storage drive 9 then records the received write data in a storage medium. Upon completion of the storing for redundancy, the second controller module 7b outputs a completion response to the first controller module 7a. When the completion response is received, the first controller 15a outputs a completion report to the server apparatus 2 (procedure 8).

The first controller module 7a then enters a state of waiting for a command. The first controller 15a continuously processes the write jobs registered in the job management table 17a to lower the number of jobs waiting for processing as much as possible.

Therefore, the storage apparatus 3 uses the load countermeasure process 4 to avoid an increase the number of jobs waiting for processing in the first controller module 7a and to allow the storage apparatus to stay away from a high load condition. Thus, by using the load countermeasure process 4 to extend the time from the reception of the write command to the output of the completion report, the time for write processing may be assured. Consequently, the use of the write processing time facilitates the reduction of the number of jobs waiting for processing in the first controller module 7a to help alleviate the high load condition.

Write processing by the write-through mode takes a longer time than the normal processing time (write-back mode) to output the completion report to the server apparatus 2 due to the drive of the storage drive 9. The timeout setting time of the server apparatus 2 is set to a maximum time when executing the write processing using the write-through mode.

As a result, the load countermeasure process 4 has a large impact on the processing performance of the storage apparatus 3. Specifically, processing performance is reduced approximately 40 to 50%, for example, according to the volume of the write data designated as a processing target data by the write command. However, the server apparatus 2 may not have to recognize the execution of the load countermeasure process 4 and the server apparatus 2 may not have to execute any special processing.

Figure 8:
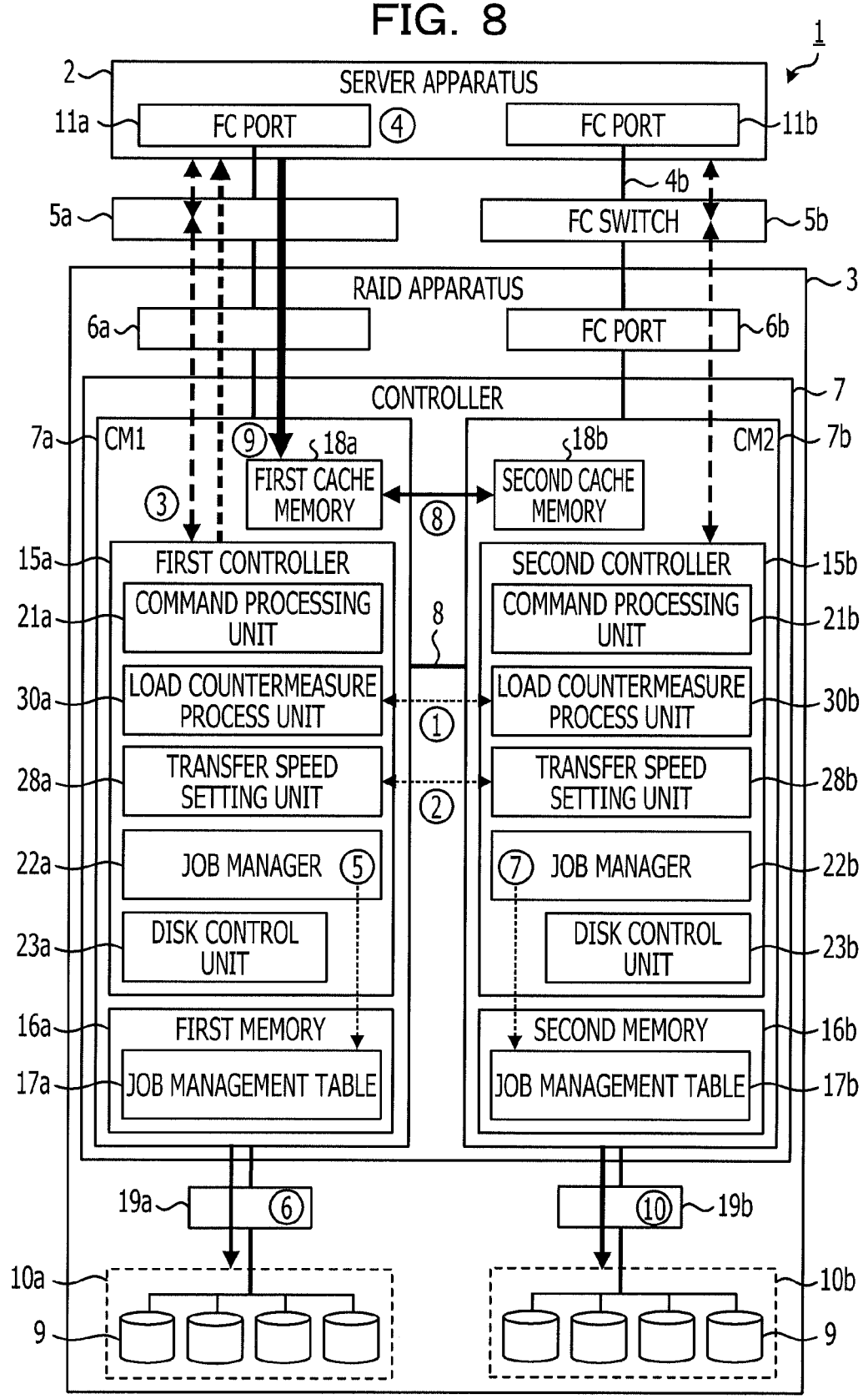
FIG. 8 illustrates a load countermeasure process 5.

FIG. 8 illustrates a load countermeasure process 5. When the load factor determined by the load condition determining unit 31 exceeds a first threshold (for example, 70%) in the load countermeasure process unit 30a, the first mode/second mode selecting unit 32 selects the second mode.

The load countermeasure process selecting unit 33 selects the load countermeasure process 5. The operating setting flag of the first controller module 7a is then set to the second mode load countermeasure process 5. The load countermeasure process unit 30a issues a command to change the operating settings to the load countermeasure process unit 30b such that the load countermeasure process unit 30b sets the operating setting flag of the second controller module 7b to the second mode load countermeasure process 5 (procedure 1).

The load countermeasure process execution instructing unit 34 in the first controller module 7a instructs a transfer speed setting unit 28a to reduce the host I/F data transfer speed to a speed lower than that under normal processing to change the communication bandwidth between the interfaces of the server apparatus 2 and the first controller module 7a.

Specifically, the setting of the host I/F data transfer speed is changed due to the load countermeasure process 5 to a predetermined value lower than the host I/F data transfer speed under normal processing. The setting of the host I/F data transfer speed is also changed in the same way in the second controller module 7b (procedure 2).

The setting may be changed for a FC interface using specifications such as a high-speed mode (e.g., 8 Gbps) and a low-speed mode (e.g., 4 Gbps). The setting may also be changed for iSCSI or SUS using specifications such as a high-speed mode (e.g., 6 Gbps) and a low-speed mode (e.g., 3 Gbps).

When the second mode load countermeasure process 5 is set, the transfer speed setting units 28a and 28b notify the FC switches 5a and 5b respectively to interrupt the connection between the FC port 11a and the FC port 6a, and the connection between the FC port 11b and the FC port 6b.

The connection between the storage apparatus 3 and the server apparatus 2 is then interrupted. The transfer speed setting units 28a and 28b then switch to the slow-speed mode and then reconnect the respective FC switches 5a and 5b. The FC switches 5a and 5b then reconnect to the server apparatus 2 (procedure 3). As a result, the operating system (OS) of the server apparatus 2 recognizes a device error of the storage apparatus 3 and a reduction in processing performance.

The server apparatus 2 sends and receives data to and from the storage apparatus 3 at the slow-speed mode data transfer speed due to the load countermeasure process 5. Therefore, the storage apparatus 3 may cause the speed of accepting commands and data from the server apparatus 2 to be reduced. Consequently, the speed in which the number of jobs waiting for processing increases may be reduced.

As a result, by using the time from the reception of the write command to the output of the completion response to the server apparatus 2, write jobs registered in the job management table 17a are executed in the load countermeasure process 5 so that the number of jobs waiting for processing may be reduced as much as possible. The procedures 1 to 3 are executed when determining the load condition.

The determining of the load condition by the load condition determining unit 31 is implemented at a predetermined timing such as at certain times or upon receiving a write command and the like. The processing of the write command after the operating setting flag is set to the second mode load countermeasure process 5 is described below.

The server apparatus 2 issues to the first controller module 7a a write command concerning the target storage drive of the storage drive cluster 10a (procedure 4). The command processing unit 21a receives and analyzes the write command and outputs the write job corresponding to the write command to the job manager 22a.

The command processing unit 21a then stores the write data designated as a processing target data by the write command in the first cache memory 18a. The job manager 22a registers the write job in the job management table 17a as a process waiting queue (procedure 5).

During that time period, the first controller 15a continuously processes the write jobs registered in the job management table 17a to lower the number of jobs waiting for processing as much as possible (procedure 6). Additionally, the first controller 15a outputs a write command for redundancy and the write data stored in the first cache memory 18a to the second controller module 7b.

The command processing unit 21b of the second controller module 7b analyzes the write command and outputs the write job corresponding to the write command to the job manager 22b. The job manager 22b registers the write job corresponding to the write command in the job management table 17b (procedure 7).

The command processing unit 21b stores the write data in the second cache memory 18b (procedure 8). The second controller module 7b then outputs a completion response to the first controller module 7a.

The first controller 15a receives the completion response and outputs a completion report corresponding to the write command to the server apparatus 2 (procedure 9). The first controller module 7a then enters a state of waiting for a command.

The first controller 15a then continuously processes the write jobs waiting for processing registered in the job management table 17a to lower the number of jobs waiting for processing as much as possible. The second controller 15b independently executes the write jobs stored in the job management table 17b (procedure 10).

As described above, the storage apparatus 3 may cause the speed of accepting commands and data from the server apparatus 2 to be reduced and the speed of the increase in the number of jobs waiting for processing may be reduced through the load countermeasure process 5. By implementing the load countermeasure process 5, the output of the completion report may be reduced by several milliseconds in comparison to the same under normal processing (when the first mode is set).

Thus, by using the load countermeasure process 5 to extend the time from the reception of the write command to the output of the completion report, the time for write processing may be assured. Consequently, the use of the write processing time facilitates the reduction of the number of jobs waiting for processing in the first controller module 7a to help alleviate the high load condition.

As a result, the load countermeasure process 5 has an intermediate impact on the processing performance of the storage apparatus 3. However, the server apparatus 2 is made aware of the execution of the load countermeasure process 5 due to the interruption of the interfaces. Since an error is detected, the load countermeasure process 5 has an impact on the processing performance of the server apparatus 2. Therefore, the load countermeasure process 5 is desirably executed when reducing the load condition is a priority.

Figure 9:
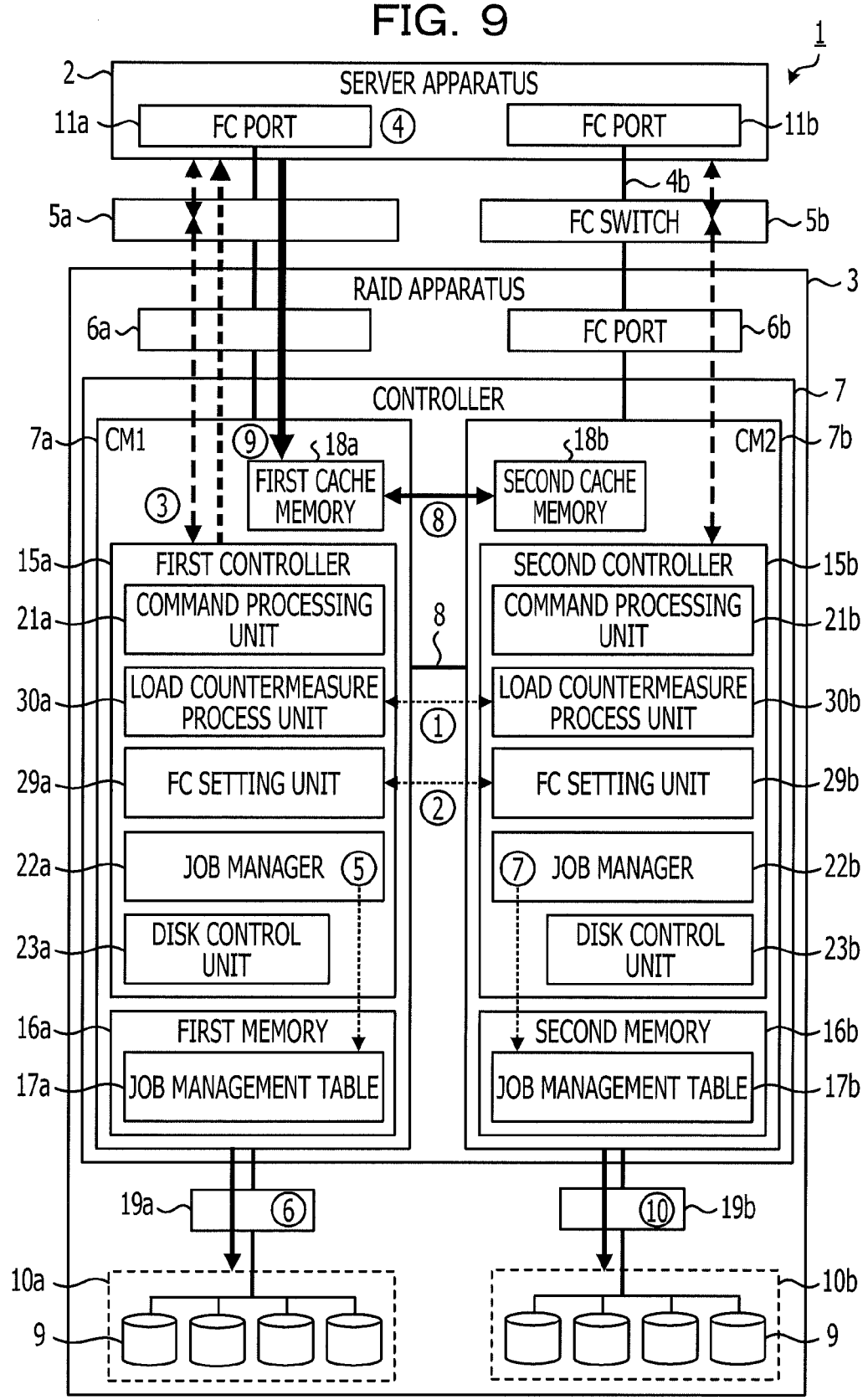
FIG. 9 illustrates a load countermeasure process 6.

FIG. 9 illustrates a load countermeasure process 6. When the load factor determined by the load condition determining unit 31 exceeds a first threshold (for example, 70%) in the load countermeasure process unit 30a, the first mode/second mode selecting unit 32 selects the second mode.

The load countermeasure process selecting unit 33 selects the load countermeasure process 6 when the host I/F is an FC interface. The load countermeasure process selecting unit 33 does not select the load countermeasure process 6 if the host I/F is another type of interface.

The operating setting flag of the first controller module 7a is then set to the second mode load countermeasure process 6 of the second mode. The load countermeasure process unit 30a issues a command to change the operating settings to the load countermeasure process unit 30b such that the load countermeasure process unit 30b sets the operating setting flag of the second controller module 7b to the second mode load countermeasure process 6 (procedure 1).

The load countermeasure process execution instructing unit 34 in the first controller module 7a instructs an FC setting unit 29a to change the BB credit setting. Specifically, an allowable frame count for sending and receiving between the FC port 11a and the FC port 6a is changed.

A mechanism called BB credits is used in the flow control of fiber channels. Negotiation is executed between sending and receiving ports when a link is established such that the link is established with a buffer size (one buffer is one frame portion) that is the smallest buffer size of the buffer sizes mutually held by the ports. As a result, a sending side is able to recognize a frame count that the receiving side is able to receive. Therefore, an amount of frames that the receiving side may not be able to receive might not be sent.

The load countermeasure process 6 uses this mechanism to set the buffer size of the storage apparatus side to a value (for example, 50%) smaller than the buffer size during normal processing by changing the BB credit setting.

As a result, an allowable frame count for sending and receiving on the server apparatus side may be changed. The allowable frame count for sending and receiving between the FC port 11b and the FC port 6b is changed in the same way for the second controller module 7b (procedure 2).

When the second mode load countermeasure process 6 is set, the FC setting units 29a and 29b notify the FC switches 5a and 5b respectively to interrupt the connection between server apparatus 2 and the storage apparatus 3.

The FC setting units 29a and 29b then change the BB credit setting, reconnect the FC switches 5a and 5b, and reopen the connection with the server apparatus 2 (procedure 3). As a result, the operating system of the server apparatus 2 recognizes a device error of the storage apparatus 3 and a reduction in processing performance.

The server apparatus 2 sends and receives data to and from the storage apparatus 3 at a frame count that is smaller than the frame count during normal processing due to the load countermeasure process 6. Therefore, the storage apparatus 3 may cause the speed of accepting commands and data from the server apparatus 2 to be reduced. Consequently, the speed in which the number of jobs waiting for processing increases can be reduced.

As a result, by using the time from the reception of the write command to the output of the completion response to the server apparatus 2, write jobs registered in the job management table 17a are executed in the load countermeasure process 6 so that the number of jobs waiting for processing may be reduced as much as possible.

The procedures 1 to 3 are executed when determining the load condition. The determining of the load condition by the load condition determining unit 31 is implemented at a predetermined timing such as at certain times or upon receiving a write command and the like. The processing of the write command after the operating setting flag is set to the second mode load countermeasure process 6 is described below.

The server apparatus 2 issues to the first controller module 7a a write command concerning the target storage drive of the storage drive cluster 10a (procedure 4). The command processing unit 21a receives and analyzes the write command and outputs the write job corresponding to the write command to the job manager 22a.

The command processing unit 21a then stores the write data designated as a processing target data by the write command in the first cache memory 18a. The job manager 22a registers the write job in a process waiting queue in the job management table 17a (procedure 5).

During that time period, the first controller 15a continuously processes the write jobs registered in the job management table 17a to lower the number of jobs waiting for processing as much as possible (procedure 6). Additionally, the first controller 15a outputs the write command for redundancy and the write data stored in the first cache memory 18a to the second controller module 7b.

The command processing unit 21b of the second controller module 7b analyzes the write command and outputs the write job corresponding to the write command to the job manager 22b. The job manager 22b registers the write job corresponding to the write command in the job management table 17b (procedure 7).

The command processing unit 21b stores the write data in the second cache memory 18b (procedure 8). The second controller module 7b then outputs a completion response to the first controller module 7a.

When the completion response is received, the first controller 15a outputs a completion report to the server apparatus 2 (procedure 9). The first controller module 7a then enters a state of waiting for a command.

The first controller 15a continuously processes the write jobs waiting for processing registered in the job management table 17a to lower the number of jobs waiting for processing as much as possible. The second controller 15b independently executes the write jobs stored in the job management table 17b (procedure 10).

As described above, the storage apparatus 3 may cause the speed of receiving commands and data from the server apparatus 2 to be reduced and the speed of the increase in the number of jobs waiting for processing may be reduced through the load countermeasure process 6.

Thus, by using the load countermeasure process 6 to extend the time from the reception of the write command to the output of the completion report, the time for write processing may be assured. Consequently, the use of the write processing time facilitates the reduction of the number of jobs waiting for processing in the first controller module 7a to help alleviate the high load condition.

The load countermeasure process 6 has a large impact on the processing performance of the storage apparatus 3, and the operating system of server apparatus 2 recognizes the execution of the load countermeasure process 6 due to the interruption of the interfaces and detects an error which affects the processing performance of the server apparatus 2. Therefore, the load countermeasure process 6 is desirably executed when reducing the load condition is a priority.

Moreover, since a high load condition is often a temporary condition, an effect of the load condition reduction may be achieved by selectively loading only one of the load countermeasure processes from 1 to 6 in the storage apparatus 3 according to the operating configuration. Additionally, the load countermeasure processes 1 to 6 may be appropriately selected as one or more processes based on accumulation conditions of the jobs waiting for processing or the continuation of high load conditions according to various operating configurations.

Figure 10:
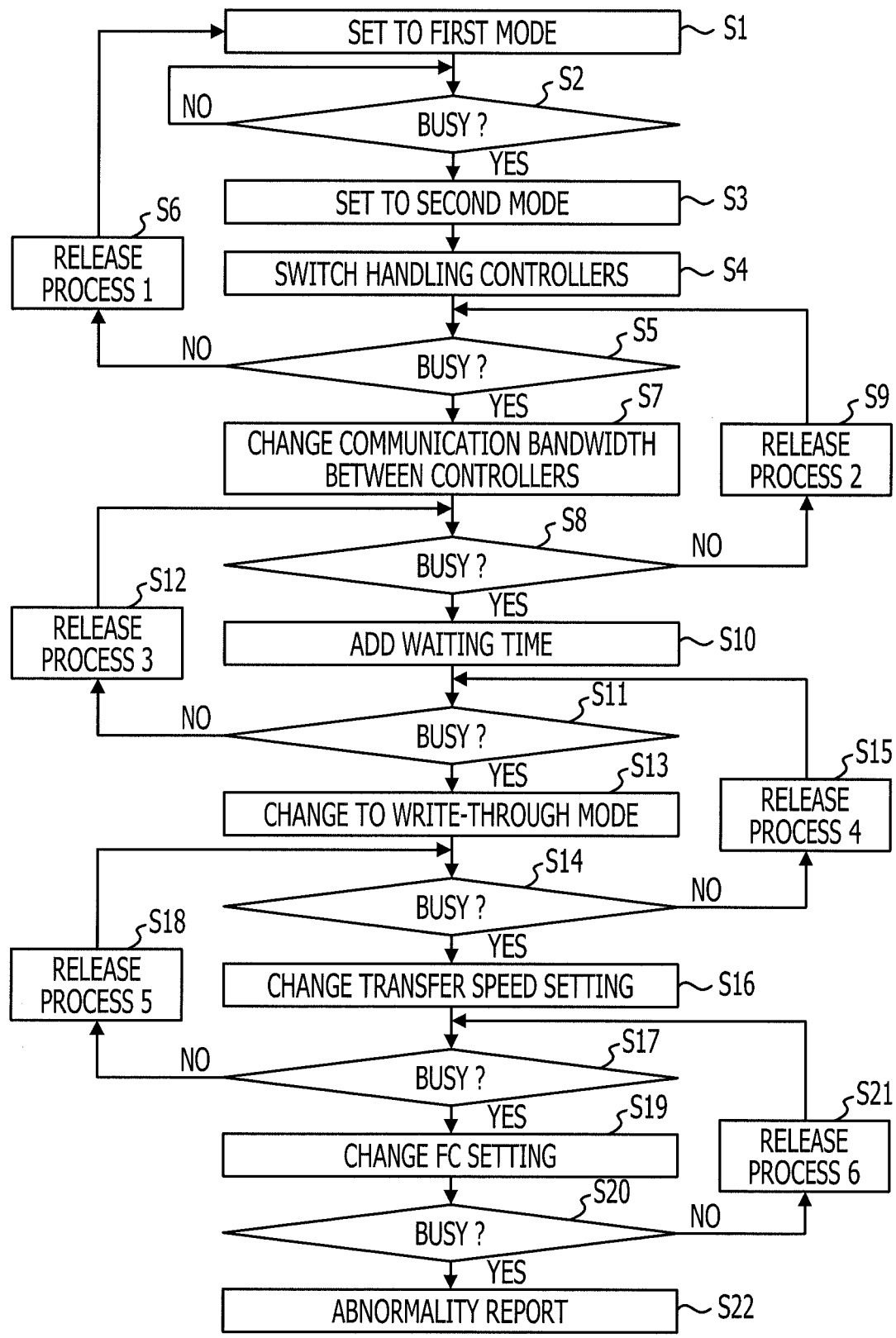
FIG. 10 is a flow chart describing load countermeasure process selection processing.

FIG. 10 is a flow chart describing load countermeasure process selection processing. FIG. 10 illustrates procedures for the load countermeasure process selecting unit 33 to select the load countermeasure processes 1 to 6 in order. The load countermeasure processes 1 to 6 are arranged in order of smallest to greatest impact on the server in FIG. 10, whereupon, if the load condition is not reduced, the next load countermeasure process is selected.

Moreover, the load countermeasure processes are selected according to the number of times a high load condition is determined. Specifically, as the load condition continues at a high level without being reduced, a load countermeasure process with the next highest reduction effect is subsequently selected even if the impact on the server is larger. Whether or not a load countermeasure process is continued is determined by using the load factor detected by the load condition determining unit 31.

When the power of the apparatus is turned on, the modes of the first and second controller modules 7a and 7b are set to the first mode (normal processing mode) (S1). The load condition determining unit 31 of the load countermeasure process unit 30a determines the load factor at a certain timing of determining. The first mode is maintained without changing the modes if the load factor is equal to or less than the first threshold (for example, 70%) (S2, NO). The load condition determining unit 31 then waits until the next timing of the determining.

If the load factor is busy, in other words, if the load factor exceeds the first threshold (S2, YES), the first mode/second mode selecting unit 32 selects the second mode (load countermeasure mode) (S3). The load countermeasure process selecting unit 33 selects the load countermeasure process 1 which has little impact on the processing performance of the storage apparatus 3.

The load countermeasure process unit 30a then sets the operating setting flags of the first and second controller modules 7a and 7b to the second mode load countermeasure process 1 to switch the controllers handling the load countermeasure process 1 described above with reference to FIG. 4 (S4). As a result, the load countermeasure process units 30a and 30b start the load countermeasure.

The load condition determining unit 31 determines the load factor at the next timing of the determining after the load countermeasure process 1 setting. If the load factor is equal to or below a second threshold (for example, 50%) (S5, NO), the load countermeasure process unit 30a releases the load countermeasure process 1 setting (S6). Furthermore, the first mode/second mode selecting unit 32 switches the modes from the second mode to the first mode (S1).

If the load factor does not meet or fall below the first threshold and remains busy even with the setting of the load countermeasure process 1 (S5, YES), the load countermeasure process selecting unit 33 selects the load countermeasure process 2 which has an intermediate impact on the processing performance of the storage apparatus 3.

The load countermeasure process unit 30a then sets the operating setting flags of the first and second controller modules 7a and 7b to the second mode load countermeasure process 2 to change the communication bandwidth between the controllers as described above with reference to FIG. 5 (S7).

The load condition determining unit 31 determines the load factor at the next timing of the determining after the load countermeasure process 2 setting. If the load factor is equal to or below a second threshold (S8, NO), the load countermeasure process unit 30a releases the load countermeasure process 2 setting (S9) and returns to the load countermeasure process 1 setting. The load condition determining unit 31 then waits until the next timing of the determining.

If the load factor does not meet or fall below the first threshold and remains busy even with the setting of the load countermeasure process 2 (S8, YES), the load countermeasure process selecting unit 33 selects the load countermeasure process 3 which has an intermediate impact on the processing performance of the storage apparatus 3.

The load countermeasure process unit 30a then sets the operating setting flags of the first and second controller modules 7a and 7b to the second mode load countermeasure process 3 to execute the process to add waiting time as described above with reference to FIG. 6 (S10).

The load condition determining unit 31 determines the load factor at the next timing of the determining after the load countermeasure process 3 setting. If the load factor is equal to or below a second threshold (S11, NO), the load countermeasure process unit 30a releases the load countermeasure process 3 setting (S12) and returns to the load countermeasure process 2 setting. The load condition determining unit 31 then waits until the next timing of the determining.

If the load factor does not meet or fall below the first threshold and remains busy even with the setting of the load countermeasure process 3 (S11, YES), the load countermeasure process selecting unit 33 selects the load countermeasure process 4 which has a larger impact on the processing performance of the storage apparatus 3. The load countermeasure process unit 30a then sets the operating setting flags of the first and second controller modules 7a and 7b to the second mode load countermeasure process 4 to change the processing to the write-through mode of the load countermeasure process 4 as described above with reference to FIG. 7 (S13).

The load condition determining unit 31 determines the load factor at the next timing of the determining after the load countermeasure process 4 setting. If the load factor is equal to or below a second threshold (S14, NO), the load countermeasure process unit 30a releases the load countermeasure process 4 setting (S15) and returns to the setting to the load countermeasure process 3. The load condition determining unit 31 then waits until the next timing of the determining.

If the load factor does not meet or fall below the first threshold and remains busy even with the setting of the load countermeasure process 4 (S14, YES), the load countermeasure process selecting unit 33 selects the load countermeasure process 5. The load countermeasure process 5 has an intermediate impact on the processing performance of the storage apparatus 3 and a device error is detected by the operating system; however, there is a large reduction effect.

The load countermeasure process unit 30a then sets the operating setting flags of the first and second controller modules 7a and 7b to the second mode load countermeasure process 5 to execute the process to change the transfer speed setting as described above with reference to FIG. 8 (S16).

The load condition determining unit 31 determines the load factor at the next timing of the determining after the load countermeasure process 5 setting. If the load factor is equal to or below the second threshold (S17, NO), the load countermeasure process unit 30a releases the load countermeasure process 5 setting (S18) and returns the setting to the load countermeasure process 4. The load condition determining unit 31 then waits until the next timing of the determining.

If the load factor does not meet or fall below the first threshold and remains busy even with the setting of the load countermeasure process 5 (S17, YES), the load countermeasure process selecting unit 33 selects the load countermeasure process 6. The load countermeasure process 6 has a larger impact on the processing performance of the storage apparatus 3 and a device error is detected by the operating system; however, there is a large reduction effect.

The load countermeasure process unit 30a then sets the operating setting flags of the first and second controller modules 7a and 7b to the second mode load countermeasure process 6 to execute the process to change the FC setting as described above with reference to FIG. 9 (S19).

The load condition determining unit 31 determines the load factor at the next timing of the determining after the load countermeasure process 6 setting. If the load factor is equal to or below the second threshold (S20, NO), the load countermeasure process unit 30a releases the load countermeasure process 6 setting (S21) and returns to the load countermeasure process 5 setting. The load condition determining unit 31 then waits until the next timing of the determining.

If the load factor does not meet or fall below the first threshold and remains busy even with the setting of the load countermeasure process 6 (S20, YES), the load countermeasure process selecting unit 33 outputs an abnormality report to the server apparatus 2 indicating that the first controller module 7a is not able to receive commands (S22). In this way, the load countermeasure process unit 30a may consider the effect on the processing performance of the storage apparatus 3 to incrementally set the load countermeasure processes.

Figure 11:
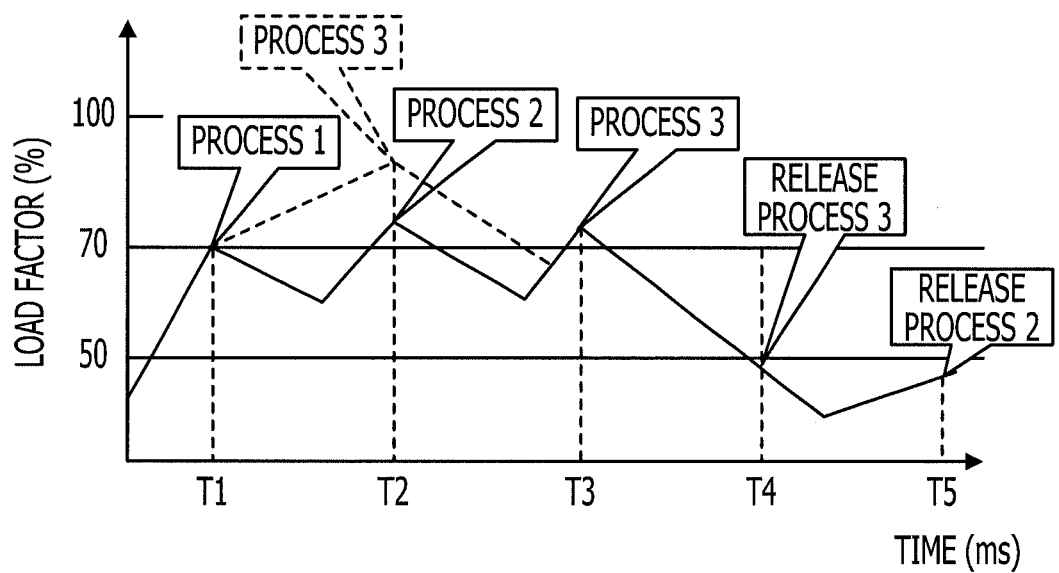
FIG. 11 illustrates a selecting order of the load countermeasure processes.

FIG. 11 illustrates a selecting order of the load countermeasure processes. FIG. 11 illustrates temporal transitions of the load countermeasure processes with the vertical axis as the load factor (%) and the horizontal axis as time (ms). When the load factor exceeds the first threshold (70%) at a timing T1, the first mode/second mode selecting unit 32 switches the modes of the first and second controller modules 7a and 7b to the second mode.

The load countermeasure process selecting unit 33 sets the operating settings of the first and second controller modules 7a and 7b to the load countermeasure process 1. When the load factor exceeds the first threshold at a timing T2 after the setting of the load countermeasure process 1, the load countermeasure process setting is switched to the load countermeasure process 2.

When the load factor exceeds the first threshold at a timing T3 after the setting of the load countermeasure process 2, the load countermeasure process setting is switched to the load countermeasure process 3. If the load factor is equal to or less than the second threshold (50%) at an timing T4 after the setting of the load countermeasure process 3, the load countermeasure process 3 setting is released and the load countermeasure process setting is returned to the load countermeasure process 2 setting.

If the load factor is equal to or less than the second threshold (50%) at a later timing T5, the load countermeasure process 2 setting is released and the load countermeasure process setting is returned to the load countermeasure process 1 setting. If the load factor is equal to or less than the second threshold (50%) at the subsequent timing, the load countermeasure process 1 setting is released and modes are switched from the second mode to the first mode.

If the load factor greatly exceeds the first threshold (70%) at the timing T2 after the load countermeasure process 1 setting and no improvement is seen in the load condition, the load countermeasure process selecting unit 33 selects a load countermeasure process with a larger effect such as the load countermeasure process 3. In this way, the load countermeasure process selecting unit 33 is able to alleviate a high load condition by being able to select a load countermeasure process according to the state of improvement of the load condition.

According to the present embodiment, the first threshold for setting the modes and the load countermeasure processes, and the second threshold for releasing the same may be appropriately set according to the specifications of the storage apparatus. Although a high load condition of the first controller module 7a has been used as an example in the descriptions in the present embodiment, similar load countermeasures may be executed by the load countermeasure process unit 30b in the same way when the second controller module 7b has a high load condition.

Moreover, complicated processing may be omitted by simply reducing the number of load countermeasure processes to one with a large effect, one with an intermediate effect, and one with a small effect, in other words, load countermeasure processes 1, 3, and 5 for example. A detailed selection of load countermeasure processes may be executed according to load condition levels and the provision of multiple thresholds.

The present disclosure is not limited to the above embodiment. Various embodiments may be combined within the limitations of consistency. The above embodiment is an example and has a substantially similar configuration to the technical ideas described in the claims of the present disclosure. Configurations that achieve similar effects are included within the scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage apparatus comprising:
   a first controller module; and
   a second controller module having a redundant configuration with the first controller module,
   the first controller module including:
      a memory that stores a job management information that registers a write job corresponding to a write command upon receiving the write command from a other apparatus;
      a cache memory that stores data designated as target data by the write command;
      a storage drive that records the data stored in the cache memory to a storage medium based on the write job registered in the job management information; and
      a controller that:
         selects one of load countermeasure processes to extend time from a reception of a write command to an output of a completion report of the write command when a load condition of the storage apparatus related to an accumulation count of the write job acquired from the job management information is high,
         when the selects one of load countermeasure processes is a write-through process,
         outputs write data designated by the write command received from the other apparatus to the storage drive without registering a write job to the job management information,
         outputs a write command for redundancy and the write data to the second controller module;
         executes the write job registered in the job management information to lower the number of the write job using time until a completion response is received from the second controller module after the write-through process is completed,
         transmits the completion report of the received write command to the other apparatus when the completion response is received from the second controller module,
   the second controller module including:
      outputting the write data outputted from the first controller module into a storage drive, when the selects one of load countermeasure processes is a write-through process
      outputting the completion response to the first controller module, when outputting the write data into the storage drive is completed.

2. The storage apparatus according to claim 1, wherein the controller selects one of a first mode and a second mode based on the load condition, the first mode including outputting the completion report of the write command to the other apparatus when storing the data in the cache memory is completed, and the second mode including executing a load countermeasure process to cause the outputting of the completion report of the write command to be delayed until after an output timing in the first mode, and including causing the execution of data recording to the storage medium by the storage drive to be executed between the reception of the write command and the outputting of the completion report delayed by the load countermeasure process based on the write job registered in the job management information.

3. The storage apparatus according to claim 2, wherein the controller selects the second mode based on a load condition of the controller and executes the load countermeasure process upon receiving the write command, and causes the storage drive to execute the data recording to the storage medium based on the write job registered in the job management information.

4. The storage apparatus according to claim 3, wherein the load countermeasure process includes a first load countermeasure process to cause the second controller module to execute a process for the write command to the first controller module.

5. The storage apparatus according to claim 3, wherein the load countermeasure process includes a second load countermeasure process to change a communication bandwidth of a bus connecting the first controller module and the second controller module.

6. The storage apparatus according to claim 3, wherein the load countermeasure process includes a third load countermeasure process in which the first controller module outputs the completion report of the write command to the other apparatus when a predetermined time has elapsed after completion of write processing of the write command.

7. The storage apparatus according to claim 2, wherein the load countermeasure process includes a fifth load countermeasure process to change a data transfer speed of an interface that connects the storage apparatus with the other apparatus.

8. The storage apparatus according to claim 3, wherein the load countermeasure process includes a sixth load countermeasure process in which the first controller module changes a buffer to buffer credit when the other apparatus is connected to the storage apparatus via a fiber channel interface.

9. A method of controlling a storage apparatus including a first controller module and a second controller module having a redundant configuration with the first controller module, the first controller module including a controller that stores in a cache memory data designated as target data by a write command sent from a other apparatus that executes data processing, registers a write job corresponding to the write command in a job management information, and records the data stored in the cache memory in a storage medium in a storage drive based on the registered write job, the method comprising:
   determining, by the controller, a load condition of the storage apparatus based on an accumulation count of write job acquired from the job management information;
   selecting, by the controller, one of the load countermeasure processes to extend time from a reception of a write command to an output of a completion report of the write command when determining the load condition of the storage apparatus is high,
   when the selects one of load countermeasure processes is a write-through process,
      outputting, by the controller, write data designated by the write command received from the other apparatus to the storage drive without registering a write job to the job management information, outputting, by the controller, a write command for redundancy and the write data to the second controller module;

executing, by the controller, the write job registered in the job management information to lower the number of the write job using time until a completion response is received from the second controller module after the write-through process is completed, and transmitting, by the controller, the completion report of the received write command to the other apparatus when the completion response of the write command is received from the second controller module.

10. A system comprising:

a computer; and a storage apparatus including a first controller module and a second controller module having a redundant configuration with the first controller module, the first controller module including:

a memory that stores a job management information that registers a write job corresponding to a write command upon receiving the write command from the computer, a cache memory that stores data designated as target data by the write command, a storage drive that records the data stored in the cache memory to a storage medium based on the write job registered in the job management information, and a controller that:

selects one of load countermeasure processes to extend time from the reception of the write command to the output of the completion report when a load condition of the storage apparatus related to an accumulation count of write job acquired from the job management information is high, when the selects one of the load countermeasure processes is a write-through process, outputs write data designated by the write command received from the computer to the storage drive without registering a write job to the job management information, outputs a write command for redundancy and the write data to the second controller module, executes the write job registered in the job management information to lower the number of the write job using time until a completion response is received from the second controller module after the write-through process is completed;

transmits the completion report of the received write command to the computer when the completion response is received from the second controller module, the second controller module that:

outputs the write data outputted from the first controller module into a storage drive, when the selects one of load countermeasure processes is a write-through process, outputs the completion response to the first controller module, when outputting the write data into the storage drive is completed.

* * * * *